(12) United States Patent
Veselka et al.

(10) Patent No.: US 10,654,593 B2
(45) Date of Patent: May 19, 2020

(54) SYSTEMS AND METHODS FOR PRESSURE CONTROL

(71) Applicant: The Boeing Company, Chicago, IL (US)

(72) Inventors: Dennis Veselka, Oviedo, FL (US); John B. Lauger, Webster, TX (US); Brian R. Dunaway, League City, TX (US); Daniel J. Leonard, Seabrook, TX (US)

(73) Assignee: THE BOEING COMPANY, Chicago, IL (US)

( * ) Notice: Subject to any disclaimer, the term of this patent is extended or adjusted under 35 U.S.C. 154(b) by 330 days.

(21) Appl. No.: 15/655,756

(22) Filed: Jul. 20, 2017

(65) Prior Publication Data

US 2019/0023428 A1    Jan. 24, 2019

(51) Int. Cl.
| | | |
|---|---|---|
| *B64G 1/50* | (2006.01) | |
| *F16K 17/02* | (2006.01) | |
| *F17C 7/00* | (2006.01) | |
| *B64G 1/60* | (2006.01) | |
| *B64G 6/00* | (2006.01) | |
| *F17C 13/04* | (2006.01) | |

(52) U.S. Cl.
CPC .............. *B64G 1/50* (2013.01); *B64G 1/60* (2013.01); *B64G 6/00* (2013.01); *F16K 17/02* (2013.01); *F17C 7/00* (2013.01); *F17C 13/04* (2013.01); *F17C 2205/0332* (2013.01); *F17C 2221/03* (2013.01); *F17C 2270/0186* (2013.01)

(58) Field of Classification Search
CPC .... B64G 1/50; B64G 1/60; B64G 6/00; F16K 17/02; F17C 13/04; F17C 2205/0332; F17C 2221/03; F17C 2270/0186; F17C 7/00; A61M 16/12; A61M 16/1015; A61M 2016/1025; A61M 2016/0027; A64D 13/04; A62B 7/14; A62B 18/00; B64D 10/00; B64D 2010/00; B64D 2010/002; B64D 2010/005; B64D 2010/007
See application file for complete search history.

(56) References Cited

U.S. PATENT DOCUMENTS

| | | | | |
|---|---|---|---|---|
| 2,703,572 A | * | 3/1955 | Seeler | A62B 9/02 128/201.28 |
| 2,819,590 A | * | 1/1958 | Green | B64D 13/06 62/5 |
| 2,929,377 A | * | 3/1960 | Cummins | A62B 9/022 128/204.25 |
| 3,103,927 A | * | 9/1963 | Henneman | B64D 13/04 128/201.28 |
| 3,215,057 A | * | 11/1965 | Turek | A61M 16/12 454/70 |

(Continued)

*Primary Examiner* — Bradley H Philips
*Assistant Examiner* — Nathan M Le
(74) *Attorney, Agent, or Firm* — Parsons Behle & Latimer

(57) ABSTRACT

A pressure control system includes at least one tank storing a mixture of oxygen and nitrogen. The system further includes a first branch of a pressure control line configured to transport a first portion of the mixture of oxygen and nitrogen to a pressurized enclosed volume. The system also includes a second branch of the pressure control line configured to transport a second portion of the mixture of oxygen and nitrogen to at least one flight suit removably coupled to the second branch.

20 Claims, 5 Drawing Sheets

(56) References Cited

U.S. PATENT DOCUMENTS

| | | | | |
|---|---|---|---|---|
| 3,318,307 A * | 5/1967 | Nicastro | A62B 7/06 | 128/201.21 |
| 3,415,310 A * | 12/1968 | Kuhlmann | F24F 5/00 | 62/78 |
| 4,095,593 A * | 6/1978 | Webbon | B64G 6/00 | 128/202.11 |
| 4,403,608 A * | 9/1983 | Warncke | A62B 17/006 | 128/201.28 |
| 4,638,791 A * | 1/1987 | Krogh | B64D 10/00 | 128/204.23 |
| 4,651,728 A * | 3/1987 | Gupta | A62B 7/14 | 128/201.28 |
| 4,960,119 A * | 10/1990 | Hamlin | A62B 7/14 | 128/201.25 |
| 5,314,402 A * | 5/1994 | Foote | B64D 10/00 | 600/19 |
| 5,318,018 A * | 6/1994 | Puma | A62B 17/008 | 128/202.11 |
| 5,531,807 A * | 7/1996 | McCombs | A62B 7/14 | 55/357 |
| 5,678,536 A * | 10/1997 | Martin | A62B 7/06 | 128/201.21 |
| 5,809,999 A * | 9/1998 | Lang | A62B 7/14 | 128/200.24 |
| 5,860,162 A * | 1/1999 | Love | A41D 13/018 | 2/2.12 |
| 5,860,857 A * | 1/1999 | Wasastjerna | A61G 10/02 | 454/338 |
| 6,347,627 B1 * | 2/2002 | Frankie | A62B 21/00 | 128/200.24 |
| 8,517,018 B2 * | 8/2013 | Wenzel | A62B 7/14 | 128/204.26 |
| 2003/0080250 A1 * | 5/2003 | Velden | B64C 37/02 | 244/118.5 |
| 2003/0145854 A1 * | 8/2003 | Hickle | A61M 16/0084 | 128/204.18 |
| 2005/0098683 A1 * | 5/2005 | Phillips | A62B 7/14 | 244/118.5 |
| 2006/0191270 A1 * | 8/2006 | Warren | A41D 13/005 | 62/3.3 |
| 2009/0095154 A1 * | 4/2009 | Barone | B01D 53/0476 | 95/96 |
| 2009/0165802 A1 * | 7/2009 | Farajallah | A62B 7/02 | 128/205.24 |
| 2009/0260631 A1 * | 10/2009 | Aubonnet | A62B 7/14 | 128/205.25 |
| 2010/0043794 A1 * | 2/2010 | Saito | B64D 13/06 | 128/204.22 |
| 2011/0000490 A1 * | 1/2011 | Gillotin | A62B 7/14 | 128/204.26 |
| 2012/0055477 A1 * | 3/2012 | Wilkinson | A61M 16/024 | 128/204.23 |
| 2013/0269090 A1 * | 10/2013 | Liu | A41D 13/0025 | 2/456 |
| 2013/0312744 A1 * | 11/2013 | Kshirsagar | B64D 11/00 | 128/202.26 |
| 2016/0047595 A1 * | 2/2016 | Williams | F25D 29/001 | 62/62 |

* cited by examiner

SYSTEMS AND METHODS FOR PRESSURE CONTROL

GOVERNMENT LICENSE RIGHTS

This invention was made with Government support under NNk14MA75C CCtCap Contract awarded by NASA. The government has certain rights in this invention

FIELD OF THE DISCLOSURE

This disclosure relates generally to pressure control, and in particular to a pressure control sub-system of a spacecraft environmental controls and life support system.

BACKGROUND

Advances are continually being made in the area of manned space flight and this area of exploration will certainly play an important role in the progress of science over the next several decades and centuries. As the reaches of manned space flight expand, new technologies are needed protect those who venture into the harsh vacuum above, while also economizing resources for longer missions and lowering the costs associated with space travel. With these goals in mind, improvements may be made to current systems and methods for spacecraft environmental controls and life support.

One aspect of environmental control and life support is pressure control. As spacecraft leave the protective confines of Earth's atmosphere, they are subjected to the vacuum of space. Without active pressure control, the environment within a spacecraft would not be habitable to humans. Further, upon launch and re-entry, the pressure differential between inside a pressurized crew cabin of a spacecraft and an exterior of the space craft can change rapidly. Typical manned spacecraft rely on separate oxygen and nitrogen pressure systems to create a breathable pressurized atmosphere within the crew module. Further, typical manned spacecraft may rely on separate systems to maintain pressure within a crew cabin, to provide breathable atmosphere for spacesuits, and to inflate landing airbags. These separate systems may result in additional cost and inefficiencies. Additional disadvantages may exist.

SUMMARY

Disclosed is a pressure control system that mitigates or resolves at least one of the disadvantages described above. In an embodiment, a system for pressure control uses a "Nitrox 24" mixture to maintain pressure within a crew module instead of separate nitrogen systems and oxygen systems. The system may further include a gas expansion cooling system for spacesuits rather than other cooling mechanisms. The system may also include a flooding prevention float valve as part of a negative pressure relief valve for water landings. The spacesuits may include a hood rather than a typical helmet and may include an 8 psia (e.g. pounds per square inch absolute) or higher fan for cooling.

In an embodiment a pressure control system includes at least one tank storing a mixture of oxygen and nitrogen. The system further includes a first branch of a pressure control line configured to transport a first portion of the mixture of oxygen and nitrogen to a pressurized enclosed volume. The system also includes a second branch of the pressure control line configured to transport a second portion of the mixture of oxygen and nitrogen to at least one flight suit removably coupled to the second branch.

In some embodiments, the mixture of oxygen and nitrogen is greater than 21 percent oxygen by volume. In some embodiments, the mixture of oxygen and nitrogen is about 24 percent (e.g., 23.5% to 24.5%) oxygen by volume. In some embodiments, the system includes a third branch of the pressure control line configured to transport a third portion of the mixture of oxygen and nitrogen to at least one airbag. In some embodiments, the system includes a cooling interface that permits gas expansion cooling of the mixture of oxygen and nitrogen before entering the at least one flight suit. In some embodiments, the system includes a negative pressure relief valve configured to enable entry of air into the pressurized enclosed volume when a pressure outside the pressurized enclosed volume exceeds a pressure within the pressurized enclosed volume by a threshold pressure differential. In some embodiments, the negative pressure relief valve includes a float valve that prevents the entry of liquid water into the pressurized enclosed volume. In some embodiments, the system includes at least one fan configured to further transport the second portion of the mixture of oxygen and nitrogen into the at least one flight suit. In some embodiments, the at least one fan is capable of generating a pressure of at least 8 psia. In some embodiments, the system includes a manual valve that enables a crew to adjust a pressure within the pressurized enclosed volume.

In an embodiment, a method for pressure control includes storing a mixture of oxygen and nitrogen within a tank. The method further includes transporting a first portion of the mixture of oxygen and nitrogen from the tank to a pressurized enclosed volume through a first branch of a pressure control line. The method also includes transporting a second portion of the mixture of oxygen and nitrogen through a second branch of the pressure control line to at least one flight suit removably coupled to the first branch.

In some embodiments, the mixture of oxygen and nitrogen is greater than 21 percent oxygen by volume. In some embodiments, the mixture of oxygen and nitrogen is about 24 percent (e.g., 23.5% to 24.5%) oxygen by volume. In some embodiments, the method includes transporting a third portion of the mixture of oxygen and nitrogen through a third branch of the pressure control line to at least one airbag. In some embodiments, the method includes cooling the mixture of oxygen and nitrogen at a cooling interface using a gas expansion nozzle before the mixture of oxygen and nitrogen enters the at least one flight suit. In some embodiments, the method includes enabling entry of air into the pressurized enclosed volume using a negative pressure relief valve when a pressure within the pressurized enclosed volume exceeds a threshold pressure. In some embodiments, the method includes preventing the entry of liquid water into the pressurized enclosed volume at a float valve of the negative pressure relief valve. In some embodiments, the method includes transporting the second portion of the mixture of oxygen and nitrogen into the at least one flight suit using at least one fan. In some embodiments, the at least one fan is capable of generating a pressure of at least 8 psia. In some embodiments, the at least one flight suit includes a hood integrated therein.

In an embodiment, a method for pressure control includes providing at least one tank storing a mixture of oxygen and nitrogen. The method further includes providing a first branch of a primary pressure control line configured to transport a first portion of the mixture of oxygen and nitrogen to a pressurized enclosed volume. The method also includes providing a second branch of the primary pressure control line configured to transport a second portion of the mixture of oxygen and nitrogen to at least one flight suit removably coupled to the second branch. In some embodiments, the method further includes providing a third branch of the pressure control line configured to transport a third portion of the mixture of oxygen and nitrogen to at least one airbag.

Figure 1:
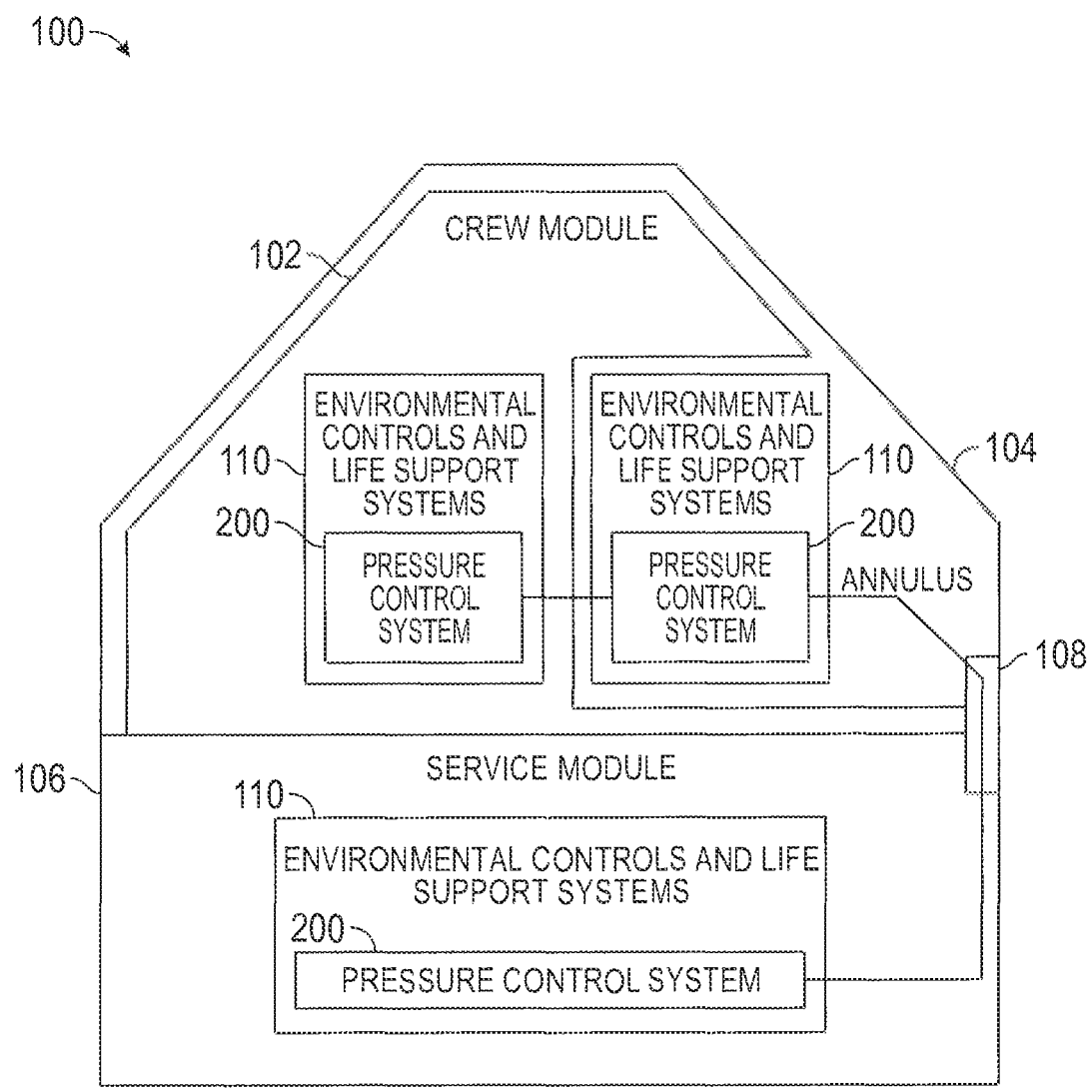
FIG. 1 is a diagram depicting an embodiment of a spacecraft that includes environmental controls and life support systems.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents, and alternatives falling within the spirit and scope of the disclosure.

DETAILED DESCRIPTION

Referring to FIG. 1, an embodiment of a spacecraft 100 is depicted. The spacecraft 100 may include a crew module 102 having an annulus 104. The spacecraft 100 may further include a detachable service module 106. An umbilical 108 may provide a link between systems within the crew module 102 and the service module 106.

The spacecraft 100 may include environmental controls and life support systems 110. Further, as part of the environmental controls and life support systems 110, the spacecraft 100 may include a pressure control system 200. Portions of the environmental controls and life support systems 110 and pressure control system 200 may be located within the crew module 102, the annulus 104, and the service module 106. While the service module 106 is attached to the crew module 102, the umbilical 108 may provide links between portions of the pressure control system 200 within the annulus 104 and portions of the Pressure control system 200 within the service module 106. Embodiments, of the pressure control system 200 are described further herein.

Figure 2:
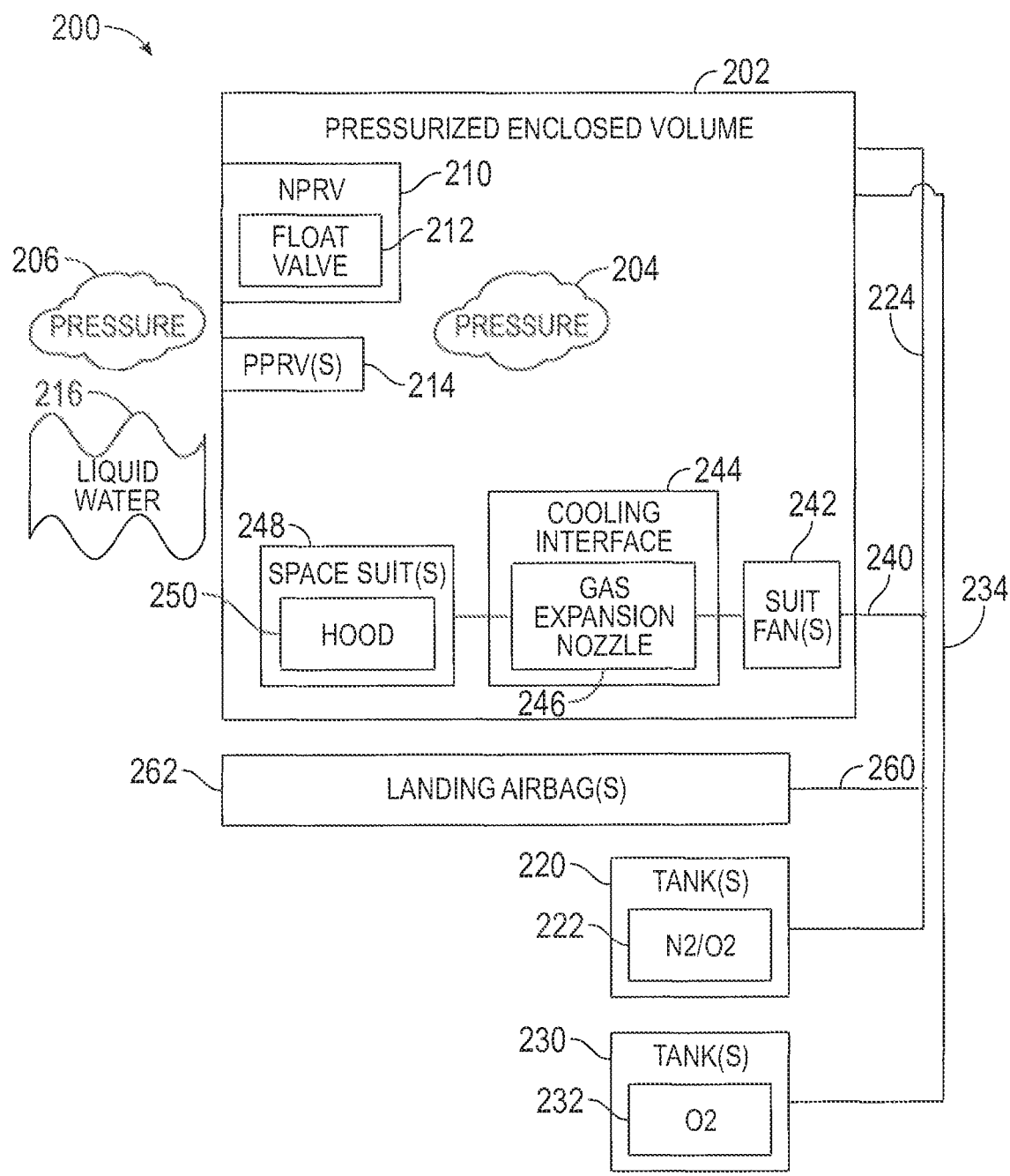
FIG. 2 is a block diagram depicting a portion of an embodiment of a pressure control system.

Referring to FIG. 2, an embodiment of a pressure control system 200 is depicted. The pressure control system 200 may include a pressurized enclosed volume 202. For example, the pressurized enclosed volume 202 may be a crew cabin of the spacecraft 100 (depicted in FIG. 1). The pressurized enclosed volume 202 may be associated with an internal pressure 204 and an external pressure 206. In order to maintain the internal pressure 204 at a target pressure within the pressurized enclosed volume 202, at least one negative pressure relief valve 210 and one or more positive pressure relief valves PPRV(S) 214 may be positioned between an interior and an exterior of the pressurized enclosed volume 202. If the internal pressure 204 is greater than a threshold then the positive pressure relief valve 214 may permit air to pass out of the pressurized enclosed volume 202, thereby reducing the internal pressure 204. Likewise, if the internal pressure 204 is less than a threshold, then the negative pressure relief valve 210 may permit air to pass into the pressurized enclosed volume 202, thereby increasing the internal pressure 204. The internal pressure 204 may be maintained at relatively constant levels near 14.7 psi. The external pressure 206, on the other hand, may typically fall within the range of 14.7 psi while near the Earth's surface and may be greatly reduced to vacuum levels while the spacecraft is in flight.

One or more tanks 220 storing a mixture 222 of oxygen and nitrogen may provide a source of air within the pressurized enclosed volume 202. Previous spacecraft have typically maintained nitrogen and oxygen in separate tanks and have included distinct systems for mixing the nitrogen and oxygen within a crew cabin. By storing the mixture 222 of oxygen and nitrogen, premixed, the system 200 may be simplified as compared to typical space craft. Further, the mixture of nitrogen and oxygen 222 may result in an optimized gas mass across the pressure control system 200. In order to provide breathable air, the mixture of oxygen and nitrogen 222 may be greater than 21 percent oxygen by volume (the approximate level of oxygen in Earth's atmosphere at sea level). In some embodiments, the mixture of nitrogen and oxygen 222 is a "Nitrox 24" mixture including about 76% nitrogen and about 24% (e.g., 23.5% to 24.5%) oxygen by volume. The mixture of nitrogen and oxygen 222 may be used to maintain the internal pressure 204 of the pressurized enclosed volume 202 by being transported to the pressurized enclosed volume 202 via a first branch 224 of a pressure control line.

The pressurized enclosed volume 202 may be protected from external elements. For example, in some cases, e.g. during a water landing, the pressurized enclosed volume 202 may be at least partially submerged in liquid water 216. A float valve 212 may protect against the liquid water 216 entering the pressurized enclosed volume 202 through the negative pressure relief valve 210. The float valve 212 may be internal to the negative pressure relief valve 210 as depicted in FIG. 2. Alternatively, the float valve 212 may be external to the negative pressure relief valve 210.

The system 200 may also include one or more tanks 230 storing oxygen 232. While the mixture 222 of oxygen and nitrogen may be used to maintain the internal pressure 204 within the pressurized enclosed volume 202, the oxygen 232 may be used to periodically replenish oxygen levels within the pressurized enclosed volume 202 taking into account oxygen consumption due to breathing. The oxygen 232 may be provided to the pressurized enclosed volume 202 through an oxygen line 234.

The system 200 may further provide pressure for emergency recovery. For example, in the event that the internal pressure 204 becomes dangerously low, the tanks 220 may provide the mixture of nitrogen and oxygen 222 to one or more flight suits, e.g. spacesuits 248. For example, a second branch 240 of the pressure control line may transport a portion of the mixture of nitrogen and oxygen 222 to one or more suit fans 242. The one or more suit fans 242 may be direct the mixture 222 of oxygen and nitrogen to a cooling interface 244. The cooling interface 244 may rely on gas expansion for cooling the air within the spacesuits 248. For example, the cooling interface 244 may include a gas expansion nozzle 246.

Gas expansion cooling generally works by releasing pressurized gas quickly, and thereby lowering its pressure. As the pressure of the gas decreases, a total energy of the gas relative to its volume, likewise, decreases. The result is a cooling effect. Air passing to the spacesuits 248 may be cooled as it passes through the gas expansion nozzle 246 in order to maintain a comfortable temperature within the spacesuits 248. Further, in some embodiments, the gas expansion nozzle 246 may be adjustable to enable a temperature of the air within the spacesuits 248 to be adjustable. In order to have sufficient pressure for gas expansion cooling, the suit fans 242 may be capable of generating at least 8 psia.

The spacesuits 248 may be configured to receive the mixture 222 of oxygen and nitrogen from the cooling interface 244. The pressure within the spacesuits 248 may be sufficient to support the structure of the spacesuits 248. For example, while typical spacesuits may have a solid, self-supporting helmet, the spacesuits 248 may instead include a hood 250 and rely on a pressure within the spacesuits 248 to support the hood 250. An advantage of having a hood instead of a solid, self-supporting helmet is that the spacesuits 248 may be simpler in design, lighter, and simpler to put on than typical spacesuits. Other advantages may exist.

As part of emergency recovery features of the system 200, the system 200 may further include a third branch line 260 to transport the mixture 222 of oxygen and nitrogen from the tanks 220 to at least one landing airbag 262. The landing airbag 262 may provide cushioning and floatation in the event of a water landing. By using the same tanks 220 to inflate the landing airbags 262 as used to maintain the internal pressure 204 of the pressurized enclosed volume 202, the system 200 may be simpler as compared to typical pressure control systems for spacecraft which include separate inflation mechanisms for landing airbags 262. Other advantages may exist.

Figure 3:
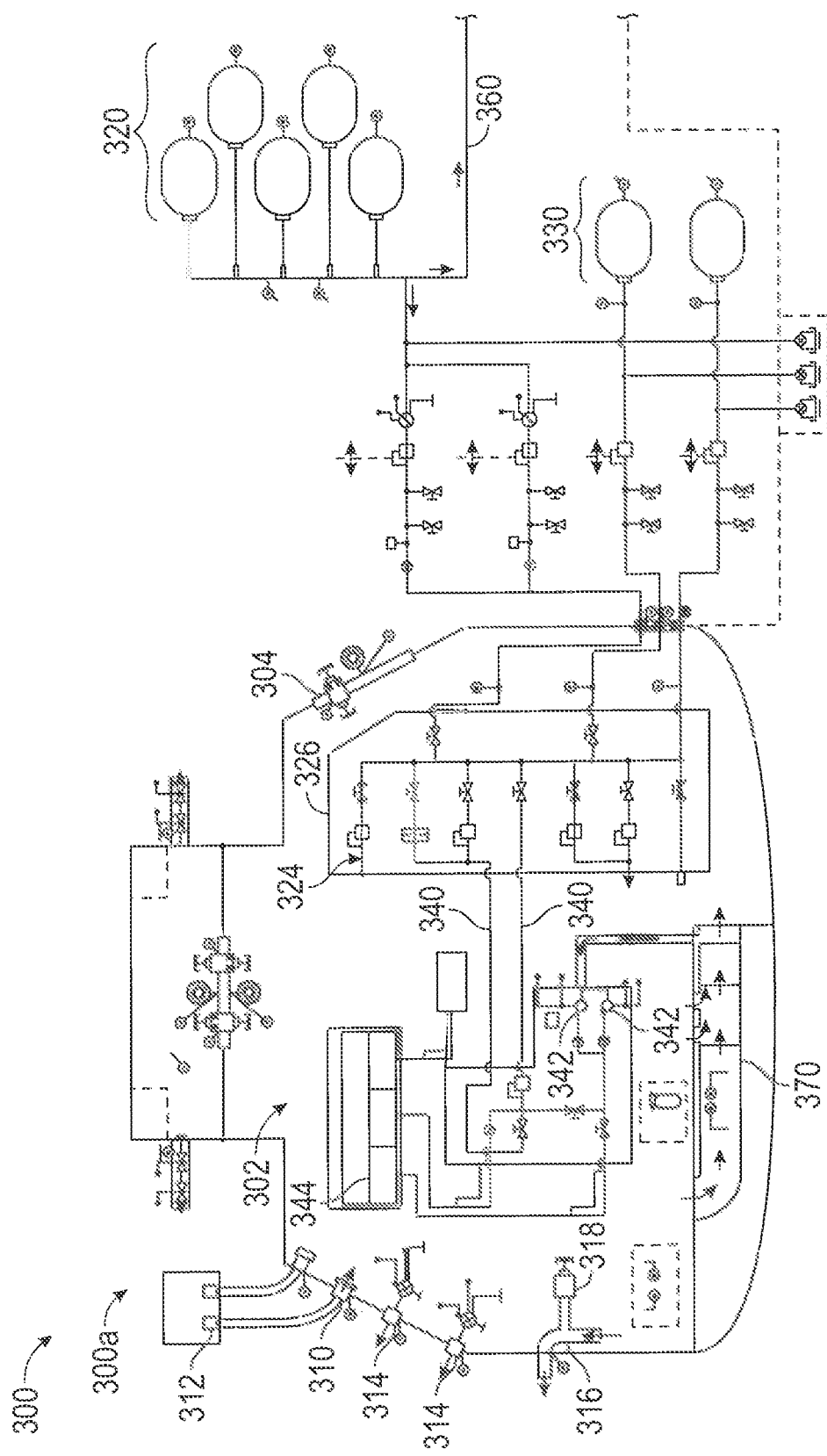
FIG. 3 is a detailed block diagram depicting a portion of an embodiment of a pressure control system within a crew module and an annulus of the crew module.

Referring to FIG. 3, a first portion 300a of an embodiment of a pressure control system 300 is depicted. The pressure control system 300 may be located within the crew module 102 and the annulus 104 of the crew module 102 described herein. The pressure control system 300 may be used to maintain an internal pressure of a pressurized enclosed crew cabin 302. A hatch 304 may separate the pressurized enclosed crew cabin 302 from an exterior. The hatch 304 may remain sealed during launch, flight, and landing of the spacecraft 100 in order to create a pressurized environment.

When the pressurized crew cabin 302 is near the surface of the earth, a target pressure within the pressurized crew cabin 302 may be about 14.7 psi. To ensure against unsafe low pressures within the pressurized crew cabin 302, one or more negative pressure relief valves 310 may be coupled to the pressurized crew cabin 302. If the internal pressure of the pressurized crew cabin 302 falls to less than a threshold, then the negative pressure relief valve 310 may permit air to pass into the pressurized crew cabin 302, thereby increasing the internal pressure. Likewise, if the internal pressure of the pressurized crew cabin 302 rises to greater than a threshold then one or more positive pressure relief valves 314 may permit air to pass out of the pressurized enclosed, thereby reducing the internal pressure. The location, numbers, size, and configuration of the negative pressure relief valves 310 and positive pressure relief valves 314 is for illustrative purposes any may be varied depending on the application as would be appreciated by one of ordinary skill in the art having the benefit of this disclosure.

The negative pressure relief valve 310 may include a float valve 312 in cases of a water landing. The float valve 312 may prevent liquid water from entering the pressurized crew cabin 302. The system 300 may also include a vent 316 with a manual valve 318 to enable a crew within the crew cabin 302 to adjust an internal pressure of the pressurized crew cabin 302. The vent 316 may be shared between other systems of the spacecraft 100, including an air revitalization system 370. The air revitalization system 370 may remove humidity and carbon dioxide from air within the pressurized enclosed volume. Previous spacecraft have relied on separate vents and ducts for individual systems. The pressure control system 300 is simplified by sharing the vent 316 with the air revitalization system 370.

The system 300 may include multiple tanks 320 storing a mixture of nitrogen and oxygen. The tanks 320 may serve multiple purposes. For example, the tanks 320 may provide air to the pressurized crew cabin 302 through a first branch 324. As another example, the tanks 320 may provide air to spacesuits through a second branch 340. In another example, the tanks 320 may provide air to landing airbags (depicted in FIG. 4) through a third branch 360. By using the tanks 320 for multiple purposes, the system 300 may be simplified as compared to typical pressure control systems. Further, typical pressure control systems may rely on multiple systems to independently control an amount of oxygen and an amount of nitrogen within the pressurized crew cabin 302. By using a mixture of nitrogen and oxygen, premixed, the system 300 may be simplified while ensuring a precise mixture of nitrogen and oxygen for breathable air. As a crew breathes oxygen in, thereby consuming it, additional tanks 330 may include oxygen to periodically supplement the air within the crew cabin 302.

A valve control panel 326 may enable a crew within the pressurized crew cabin 302 to adjust the pressure control system 300 and to direct how air is transported within the pressure control system 300. In some cases, the valve control panel 326 may be configured to enable airflow from the tanks 320 through the second branch 340 to a cooling interface 344 of a spacesuit. The cooling interface 344 may rely on gas expansion cooling to cool the air to maintain the comfort of a crewmember wearing the spacesuit. By relying on gas expansion cooling, diverting resources toward other cooling mechanisms may be avoided and battery energy consumption for cooling spacesuits may be reduced.

Air may also be provided to the spacesuit through the air revitalization system 370. In that case, air may be transported from the air revitalization system 370 to a set of suit fans 342. In an embodiment, the set of suit fans may output at least 8 psia in order for the cooling interface 344 to adequately cool the air.

Figure 4:
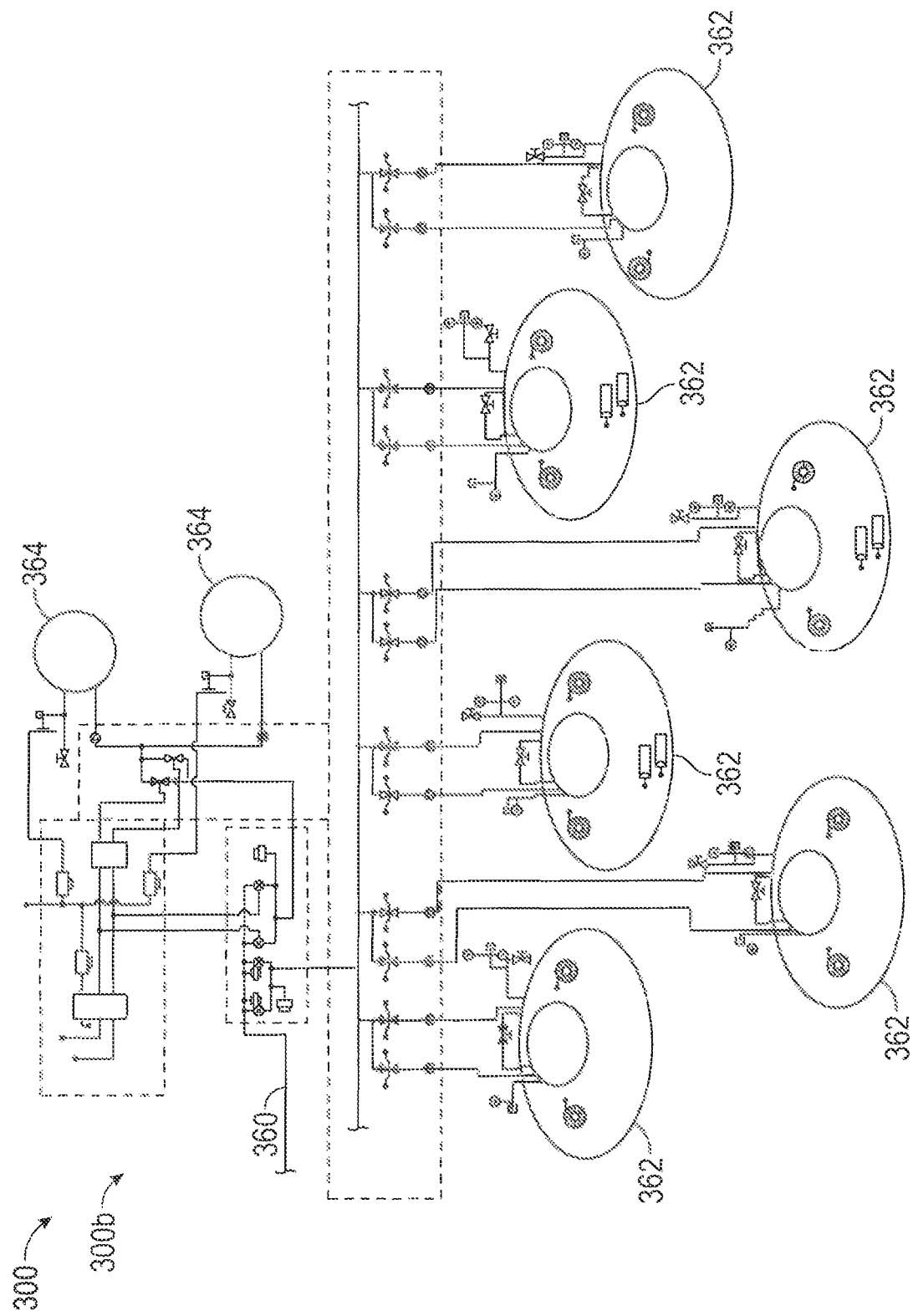
FIG. 4 is a detailed block diagram depicting a portion of an embodiment of a pressure control system within an annulus of a crew module.

Referring to FIG. 4, a portion 300b of an embodiment of a pressure control system 300 within an annulus 104 of a crew module 102 is depicted. The portion 300b of the pressure control system 300 may include multiple landing airbags 362. The landing airbags 362 may provide cushioning during a landing and floatation during a water landing. The pressure control system 300 may also include multiple upright airbags 364 that, when inflated, keep the spacecraft 100 in an upright orientation. The multiple landing airbags 362 and the multiple upright airbags 364 may receive air from the tanks 320 (depicted in FIG. 3) via the third branch 360.

As explained above, by using the same tanks 320 to provide air for the pressurized crew cabin 302 through the first branch 324, spacesuits through the second branch 340, and the landing airbags 362 through the third branch 360, the system 300 may be simplified as compared to typical pressure control systems and resources may be conserved. Other advantages may exist.

Figure 5:
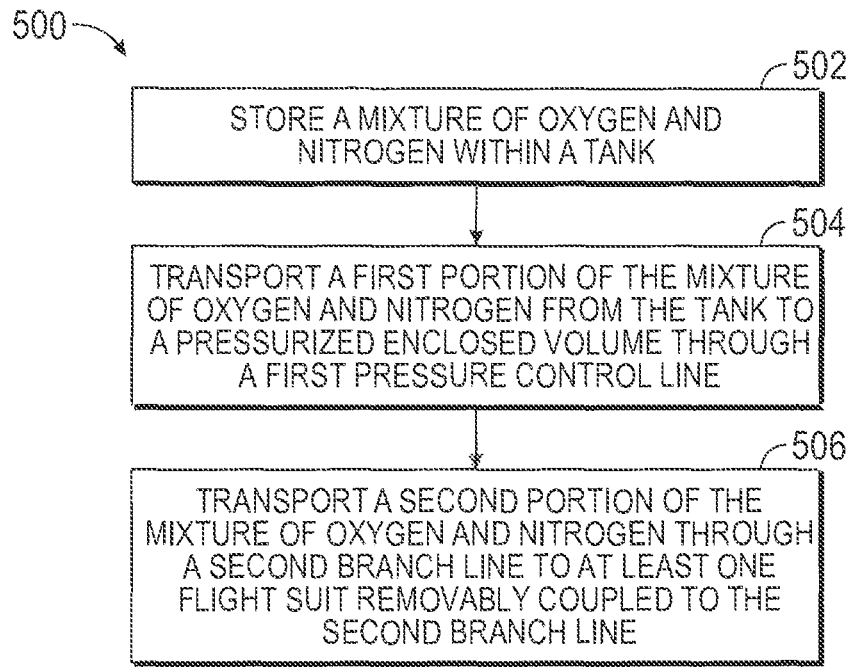
FIG. 5 is a flow chart depicting an embodiment of a method for pressure control.

Referring to FIG. 5, an embodiment of a method 500 for pressure control is depicted. The method 500 may include storing a mixture of oxygen and nitrogen within a tank, at 502. For example, the at least one tank 220 may store the mixture 222 of oxygen and nitrogen.

The method 500 may further include transporting a first portion of the mixture of oxygen and nitrogen from the tank to a pressurized enclosed volume through a first branch of a pressure control line, at 504. For example, a portion of the mixture 222 of oxygen and nitrogen may be transported to the pressurized enclosed volume 202 through the first branch 224.

The method 500 may also include transporting a second portion of the mixture of oxygen and nitrogen through a second branch line to at least one flight suit removably coupled to the second branch line, at 506. For example, a second portion of the mixture 222 of oxygen and nitrogen may be transported to the spacesuits 248.

A benefit of the method 500 is that by storing a mixture of nitrogen and oxygen, instead of maintaining separated oxygen and nitrogen systems, the method of pressure control 500 may be simplified as compared to other pressure control methods in typical spacecraft. Further, by relying on the same tanks to provide the mixture of nitrogen and oxygen to both a pressurized enclosed volume and to one or more spacesuits, the method may be further simplified. Other advantages may exist.

Figure 6:
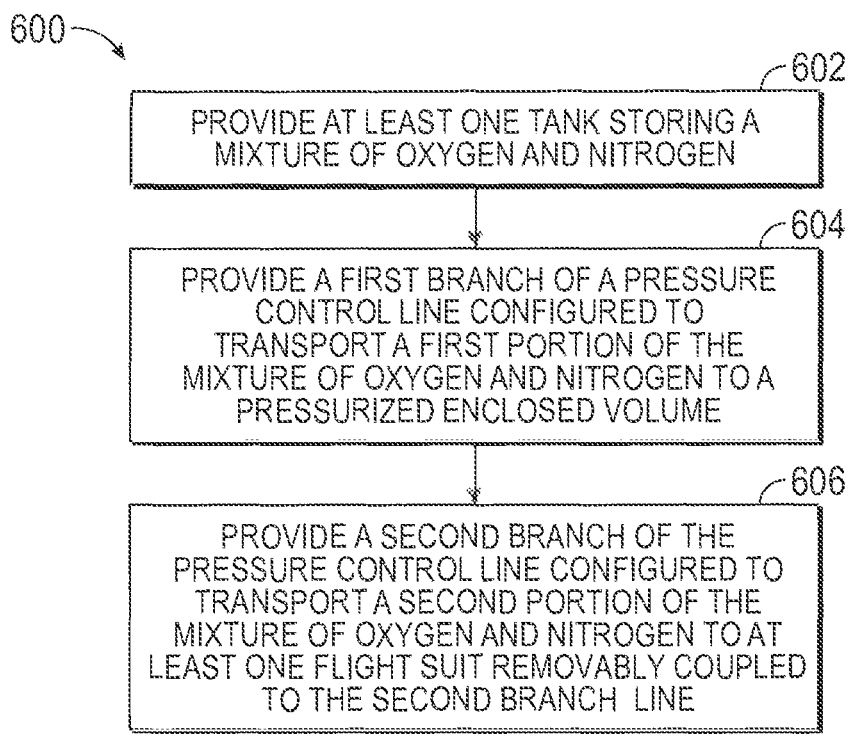
FIG. 6 is a flow chart depicting an embodiment of a method for pressure control.

Referring to FIG. 6, an embodiment of a method 600 for pressure control is depicted. The method 600 may include providing at least one tank storing a mixture of oxygen and nitrogen, at 602.

The method may further include providing a first branch of a pressure control line configured to transport a first portion of the mixture of oxygen and nitrogen to a pressurized enclosed volume, at 604. For example, the first branch 224 may be configured to transport a first portion of the mixture 222 of oxygen and nitrogen to the pressurized enclosed volume 202.

The method may also include providing a second branch of a pressure control line configured to transport a second portion of the mixture of oxygen and nitrogen to at least one flight suit removably coupled to the second branch line, at 606. For example, the second branch 240 may be configured to transport a second portion of the mixture 222 of oxygen and nitrogen to the spacesuits 248.

Although various embodiments have been shown and described, the present disclosure is not so limited and will be understood to include all such modifications and variations as would be apparent to one skilled in the art.

What is claimed is:

1. A pressure control system comprising:
    at least one tank storing a mixture of oxygen and nitrogen;
    a first branch of a pressure control line configured to transport a first portion of the mixture of oxygen and nitrogen to a pressurized enclosed volume;
    a second branch of the pressure control line configured to transport a second portion of the mixture of oxygen and nitrogen to at least one flight suit removably coupled to the second branch; and
    a negative pressure relief valve configured to enable entry of air into the pressurized enclosed volume when a pressure outside the pressurized enclosed volume exceeds a pressure within the pressurized enclosed volume by a threshold pressure differential, wherein the negative pressure relief valve comprises a float valve that prevents the entry of liquid water into the pressurized enclosed volume.

2. The pressure control system of claim 1, wherein the mixture of oxygen and nitrogen is greater than 21 percent oxygen by volume.

3. The pressure control system of claim 1, further comprising:
    a third branch f the pressure control line configured to transport a third portion of the mixture of oxygen and nitrogen to at least one airbag.

4. The pressure control system of claim 1, further comprising:
    a cooling interface that permits gas expansion cooling of the mixture of oxygen and nitrogen before entering the at least one flight suit.

5. The pressure control system of claim 1, further comprising:
    at least one fan configured to further transport the second portion of the mixture of oxygen and nitrogen into the at least one flight suit.

6. The pressure control system of claim 5, wherein the at least one ran is capable of generating a pressure of at least 8 psia.

7. The pressure control system of claim 1, further comprising a manual valve that enables a crew to adjust a pressure within the pressurized enclosed volume.

8. A method for pressure control comprising:
    storing a mixture of oxygen and nitrogen within a tank;
    transporting a first portion of the mixture of oxygen and nitrogen from the tank to a pressurized enclosed volume through a first branch of a pressure control line;
    transporting a second portion of the mixture of oxygen and nitrogen through a second branch of the pressure control line to at least one flight suit removably coupled to the first branch;
    enabling entry of air into the pressurized enclosed volume using a negative pressure relief valve when a pressure within the pressurized enclosed volume exceeds a threshold pressure; and
    preventing the entry of liquid water into the pressurized enclosed volume at a float valve of the negative pressure relief valve.

9. The method of claim 8, wherein the mixture of oxygen and nitrogen is greater than 21 percent oxygen by volume.

10. The method of claim 8, further comprising:
    transporting a third portion of the mixture of oxygen and nitrogen through a third branch of the pressure control line to at least one airbag.

11. The method of claim 8, further comprising:
    cooling the mixture of oxygen and nitrogen at a cooling interface using a gas expansion nozzle before the mixture of oxygen and nitrogen enters the at least one flight suit.

12. The method of claim 8, further comprising:
    transporting the second portion of the mixture of oxygen and nitrogen into the at least one flight suit using at least one fan.

13. The method of claim 12, wherein the at least one fan is capable of generating a pressure of at least 8 psia.

14. The method of claim 8, wherein the at least one flight suit includes a hood integrated therein.

15. A method for pressure control comprising:
    storing a mixture of oxygen and nitrogen;
    transporting a first portion of the mixture of oxygen and nitrogen to a pressurized enclosed volume through a first branch of a primary pressure control line;

transporting a second portion of the mixture of oxygen and nitrogen to at least one flight suit removably coupled to a second branch of the primary pressure control line; and enabling entry of air into the pressurized enclosed volume using a negative pressure relief valve when a pressure outside the pressurized enclosed volume exceeds a pressure within the pressurized enclosed volume by a threshold pressure differential, wherein the negative pressure relief valve comprises a float valve that prevents the entry of liquid water into the pressurized enclosed volume.

16. The method of claim 15, further comprising:

transporting a third portion of the mixture of oxygen and nitrogen to at least one airbag.

17. The method of claim 15, wherein the mixture of oxygen and nitrogen is greater than 21 percent oxygen by volume.

18. The method of claim 15, further comprising:

cooling the mixture of oxygen and nitrogen before entering the at least one flight suit.

19. The method of claim 15, further comprising:

transporting the second portion of the mixture of oxygen and nitrogen into the at least one flight suit using at least one fan.

20. The method of claim 15, further comprising:

adjusting a pressure within the pressurized enclosed volume.

* * * * *